United States Patent [19]
Ferri

[11] 3,838,326
[45] Sept. 24, 1974

[54] MECHANICAL-HYDRAULIC INTERLOCKED DIGITAL CONTROLLED POSITIONING APPARATUS

[76] Inventor: Beniamino Ferri, Via Rovani, 6, Monza, Italy

[22] Filed: Apr. 19, 1972

[21] Appl. No.: 245,569

[30] Foreign Application Priority Data
Apr. 21, 1971 Italy .................................. 23450/71

[52] U.S. Cl. ................................ 318/573, 340/347
[51] Int. Cl. ........................................... G05b 19/24
[58] Field of Search ...................... 318/573; 340/347

[56] References Cited
UNITED STATES PATENTS
3,195,111   7/1965   Kunkel........................... 318/573 X
3,297,924   1/1967   Kamm.............................. 318/573

Primary Examiner—T. E. Lynch
Attorney, Agent, or Firm—Bacon & Thomas

[57] ABSTRACT

Method and apparatus for positioning a workpiece in a plurality of locations relative to a tool, in which a digitally controlled, rotatable indexing drum carrying axially spaced index projections about the periphery thereof is mounted to a frame and positioned such that a preselected one of the projections may be rotatably interposed between a pair of opposed extendible pushers mounted on a carriage movable relative to the frame. The drum is sequentially rotatably positioned in accordance with the preselected program, with the pushers actuated after each separate movement of the drum to shift the workpiece into the various desired positions relative to the tool.

13 Claims, 9 Drawing Figures

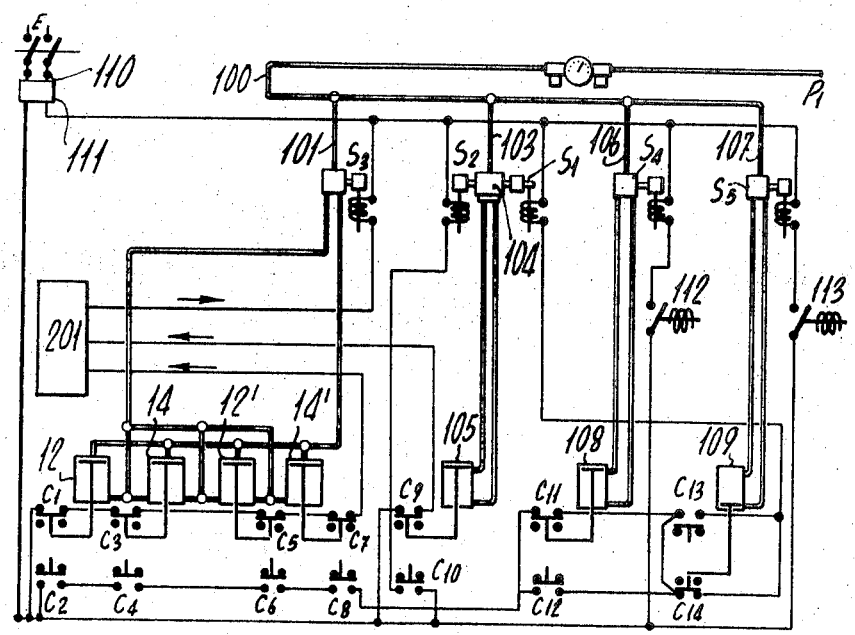
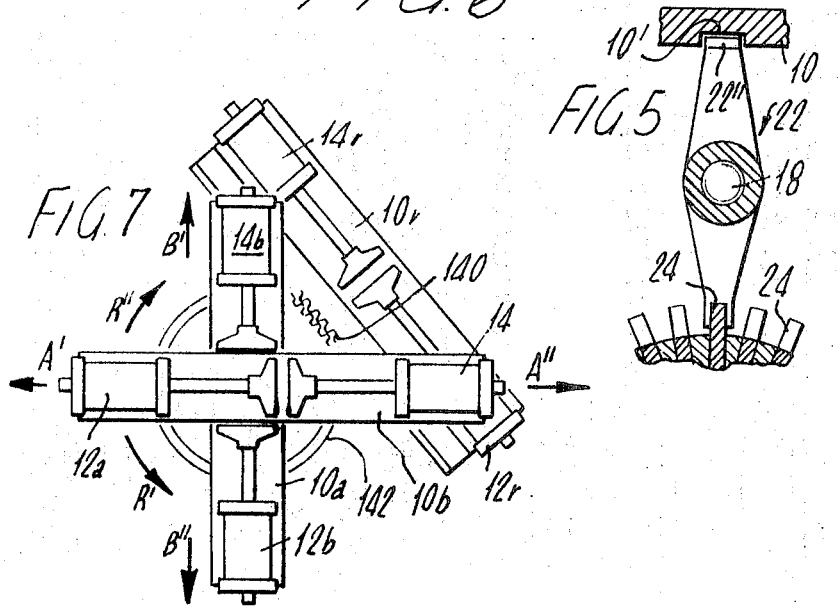

MECHANICAL-HYDRAULIC INTERLOCKED DIGITAL CONTROLLED POSITIONING APPARATUS

This invention relates to a method and an apparatus, by which one or more workpieces, tools, operating heads or the like can be mechanically and sequentially located into a plurality of positions according to a predetermined working program, so that at each of the selected positions one or more operations can be carried out according to a desired processing cycle.

In the industrial utilization of machine tools, and in particular of those machines that are designed to perform a plurality of machining operations, in different positions, on a workpiece, it is very important to provide means by which the required shifting can be automatically and accurately accomplished, possibly without any manual intervention. Devices of this general type, used in duplicating lathes, are restricted to perform a particular function and moreover, typically require a copying template, that acts as a programming element. In other machine tools, use is made of cam means that allow a shifting into a rather small number of positions only, and that moreover do not allow quick changes in the selected program, up to the point that they can really be utilized only when the program type is a constant in the operation of the machine.

Electronic systems are also known which operate on the basis of perforated cards, magnetic tapes, magnetic plates or the like and are able to control the motors of machine tools for bringing the workpiece and the tools in the required positions with respect to each other. Such systems are however highly expensive and their industrial application is yet — at least in the presently attained state of the technique — hardly convenient from an economical viewpoint.

Conversely, this invention allows the quick and accurate attainment of the required positioning by making use of digital controlled mechanical devices of unusually simple design which also allow quick changes in the working program. Each program provides for any number of positions, thereby eliminating all the restriction of the heretofore utilized mechanical systems and operating in a manner wholly comparable with complex systems. With respect to the latter, the device of the present invention shows a simplicity of design and a reliability of operation such as to allow economic application to practically all machine tools which are operable according to a preestablished program.

According to one aspect of the present invention there is provided a method and apparatus for sequentially locating a tool or workpiece in any of a plurality of work positions established along at least one linear path. Each position is defined by a digital controlled step indexing means having a plurality of projections placed at spaced intervals, with respect to the direction of the path, about the periphery of a stepwise rotatable cylindrical drum. The drum is digitally controlled in accordance with a preselected program such that the said projections cooperate with hydraulic or pneumatic pushers to position the tool or workpiece at the various desired locations. In operation, one of the projections is positioned in an operative position between the two pushers, and the pushers are advanced toward each other by corresponding power means. The pushers continue along a linear path in which the first mentioned projection lies, in such a way that during their progress forward one of the pushers contacts the projection causing movement of the tool or workpiece from a first position to a second operative position corresponding to that of the preselected projection. The tool or workpiece is thereafter locked in position at the end of the stroke of the two pushers when they are both in contact with the projection. After the above programmed operation has been carried out, the pushers may be withdrawn from the first projection, a second projection may be digitally selected and positioned into operative position between the pushers, and the pushers may be advanced again to position the tool or workpiece in the next position as set forth in the desired program.

More particularly, an object of the present invention is to provide a digital controlled positioning apparatus which is simple in construction, accurate and quick in operation, and low cost.

The simplicity of the apparatus according to the invention resides in the fact that the digital-controlled drive members do not perform any power functions during operation, but merely control a stepwise positionable index against which the main power positiong means acts to move the workpiece.

The fastness rapidity of the apparatus according to the invention is due to the combined speed of the electronic digital control circuit and the pneumatic or hydraulic power positioning means, with system accuracy due primary to the positive mechanical action of the stepwise positionable index.

A further object of the present invention is to provide a positioning apparatus particularly suitable for an unlimited amount of processing positions and capable of readily accommodating various requirements.

Therefore, by the apparatus according to the invention, a variety of complex movements or positioning operations can be performed in one or more predetermined directions or axes. Moreover, the apparatus according to the invention can be used to position one or more workpieces relative to one or more tools or operating heads according to a predetermined processing schedule with high versatility; the apparatus further being capable of performing positioning operations either for the workpiece(s), or the tools.

These and other objects and advantages of the present invention will be apparent from the following detailed description of a preferred embodiment when taken in conjunction with the attached drawings.

FIG. 5 is a fragmentary view showing a detail of the positioning means FIG. 2;

FIG. 6 is a detailed view of the operating circuit for the control apparatus of FIGS. 1 and 2;

FIG. 7 is a schematic plan view of a modification of the embodiment of FIG. 2 showing a system for carrying out complex positioning operations according to three coplanar directions;

Figure 1:
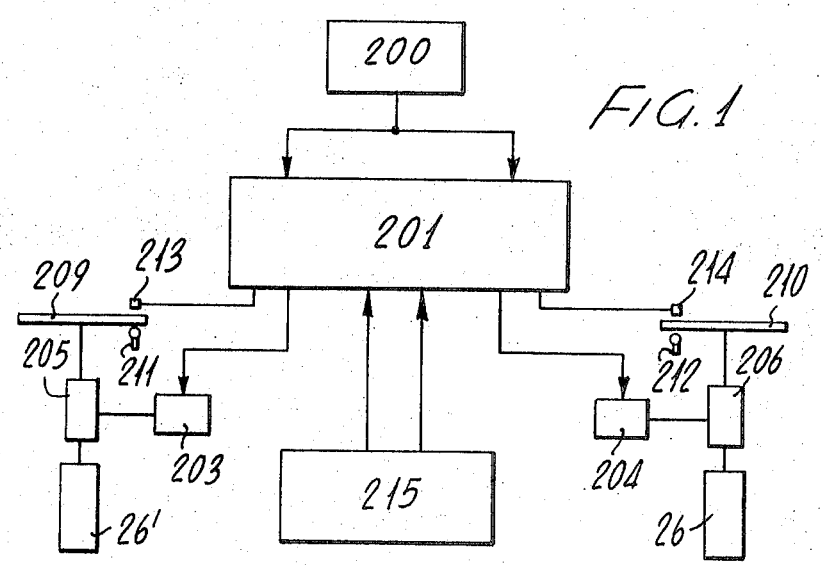
FIG. 1 is an electric block diagram of a digital-controlled system for positioning operations relative to two major directions for an apparatus according to the present invention.

Generally, according to the invention, a positioning apparatus for positioning at least one piece to be processed according to a sequence of predetermined positions, relative to one or more tools and/or operating heads, includes at least one movable unit and one stationary unit, each of which being connected to a workpiece to be processed and/or a toolholder, wherein each movable unit has two opposite pushers opposing to move along a single path between minimum and maximum spaced positions. Each of the pushers is operated by a piston and cylinder mounted on the movable unit, with both pushers cooperating with a stepwise rotatable indexing mechanism carrying a plurality of projections of a same size as the minimum distance between the pushers. The indexing mechanism is digitally advanced to move the various projections, in sequence, between the pushers, causing the workpiece to be moved relative to the tool to various work positions in the program.

Referring more particulary to FIGS. 1-6, it will be seen that the device, as shown, is used to position a workpiece P, such as a plate, relative to a tool U, such as a drill which is clamped in a toolholder head (not shown).

Tool U is normally spaced from the workpiece and is adapted for reciprocal as well as rotational movement. Workpiece P is clamped in any known manner to a suitable structure, such as a frame or working plane 10 slidably supported, for example by guides not shown, to accomplish movement in both directions along a predetermined path, as shown by arrows A' and A'' in FIG. 2. Workpiece P can be positioned by the apparatus according to the invention, so that the tool U operates at a plurality of predetermined positions which can be selected, for example, along a line parallel to the direction of movement of frame 10.

Of course, the foregoing is given by mere way of example only, it being understood that other machining operations can be carried out by providing different tools; additionally, by providing a larger amount of operating heads or tools, a plurality of operations can be concurrently carried out on the same workpiece or on different workpieces. Moreover, it is assumed herein that tool U may be provided with only a feed and retraction movement, but, as it will be clearly understood, the operating head or tool U could be carried by a movable unit quite similar to that of the workpiece to provide complex positioning operations in a plane.

Two hydraulic or pneumatic piston and cylinder units 12 and 14, coaxially and oppositely symmetrically arranged, are connected to the frame or working plane 10. The piston and cylinder units, which may be of single or double-acting type, are sized and arranged so that rods 16 and 18, respectively, connected with the associated pistons thereof, travel strokes L' and L'' of accurately predetermined length and in opposite directions. At the opposite ends of rods 16 and 18, pushers 20 and 22 are secured which, as shown in FIG. 5 for pusher 22, have a top portion 22'' sliding in a guide groove 10' on the surface underlying frame 10. Pushers 20 and 22 are movable between a maximum distance L (FIG. 3) during the outward or return stroke of the associated pistons, and a minimum distance I (FIG. 2) during the forward or opposite stroke.

As a whole, the above described elements provide a movable unit capable of moving in both directions A' and A'' to perform positioning operations for said workpiece P through a positioning means or step programmer comprising, for example, a toothed drum 26 to be described below.

The several positioning operations are controlled by a digital-controlled electronic circuit shown in FIG. 1 which is adapted for positioning operations requiring movement in two directions. This circuit comprises an automatic program reader 200 connected to a processing or control unit 201. The processing unit comprises storing circuits or registers for the dimension lines relating to the axes of movement, as well as the power drives for driving the stepped motors 203 and 204, respectively, connected by gear reducers 205 and 206, or other equivalent means, to a corresponding positioning index, shown in the present example as drum or cylinders 26, 26', to be hereinafter described.

The positions of drums 26 and 26' are respectively detected by position transducer members comprising, for example, a perforated disc 209–210 connected to its associated gear reduction 205 206, and through which disc a light beam passes. The light beam may be as generated by a light source 211–212 on one side of the disc and detected or sensed by photosensitive element 213–214, on the opposite side relative to the light source. This information is compared with information stored in processing unit 201, and motors 203 and 204 are stopped upon the occurrence of equality between those two signals; that is, the level as stored in control unit 201 and the level attained by counters driven by said position transducers. A selectable input network 215 enables manual or automatic programming of the entire digital-controlled electronic system by providing, as an input, a signal establishing the stored level in processor 201.

Drum 26 is rotably carried along an axis parallel to and underlying the axis of the piston and cylinder units 12 and 14 by end bearings 28 and 30 which are connected to a frame 32 of a tool machine structure, which frame is preferably stationery during processing.

In the example herein shown, drum 26 has a plurality of axially aligned longitudinal grooves which are uniformly spaced apart from one another. In each of these grooves, a detent or porjection 24 is fixedly secured at a preselected position. The length of each detent along the axis of the drum is equal or substantially similar, within the processing tolerance limits, to the above mentioned minimal spacing I which may exist between pushers 20 and 22. As shown in the appended drawings, detents or projections 24 are interchangeably arranged on the side surface of drum 26 according to a helicoidal line, the pitch of which may be a multiple or a fraction of the drum length, with the axial spacing between adjacent projections is maintained substantially constant. Drum 26, which is directly or indirectly connected through a reduction gear to the shaft of a stepped motor forming part of the above described digital-controlled circuit, can rotate about its axis to move any of the projections 20, 24 within the path of pushers 22 so as to establish the desired center thereof during operation.

The operation of the apparatus will now be briefly described, reference being made to the appended drawings and taking into account a simple positioning operation, that is along one line only, it being obviously possible by the apparatus according to the invention to carry out more complex positioning operations in a plane, as explained hereinafter. Therefore, it is initially assumed that table 32 carrying the positioning member comprising the toothed drum 26, is stationary or held stationary, whereas table 10 is free to move in the direction as shown by arrows A' and A''.

Figure 2:
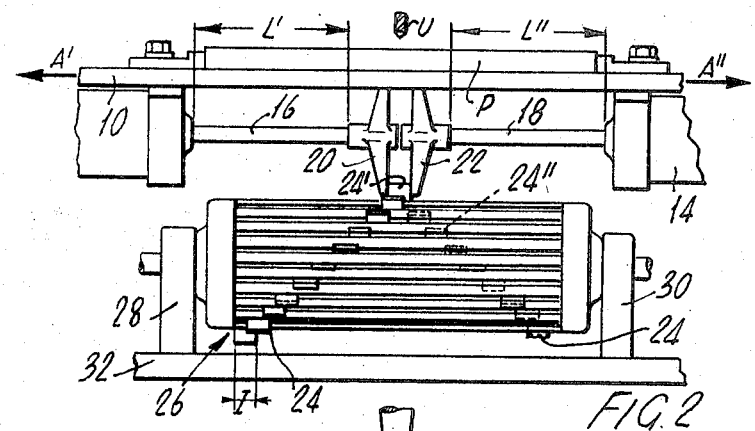
FIG. 2 is a partly sectional view of a first embodiment of a positioning means according to the invention in a first operative condition.
Figure 3:
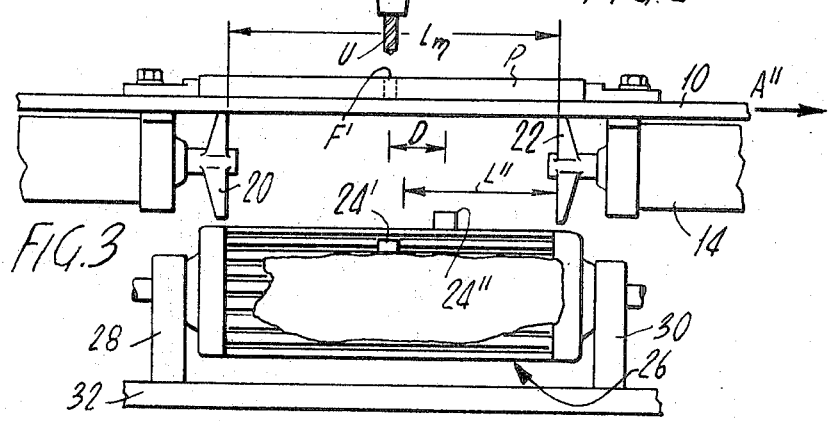
FIGS. 3 and 4 are views similar to FIG. 2 relating to further operative conditions.

It is assumed in FIG. 2 that workpiece P is positioned for drilling a hole F', as schematically shown in FIG. 3. This position is assured by one of projections 24' on said drum 26 being pressed between pushers 20 and 22 previously operated by the associated piston and cylinder units. This projection 24' had obviously previously been selected according to the program as set by the digital control.

After hole F' is drilled in workpiece P, it is assumed that a second hole F'' (FIG. 4) is to be drilled at a left-hand position spaced apart from the previous hole F' by an amount D.

The new positioning for the workpiece is provided as follows. After processor 201 causes the withdrawal of pushers 20 and 22 and in accordance with a predetermined program, reader 200 supplies to one of the processing units, such as 201, the information supplied originally from network 215 relating to the new position desired for the workpiece. Processing unit 201 drives stepped motor 203 so as to rotate drum 26 through a predetermined angle to move a second tooth or projection such as 24'' into the path of sensors 20 and 22.

After projection 24'', which is at a distance D on the righthand side of the preceding projection 24''', has been positioned in the path of pushers 20 and 22, the two piston and cylinder units 12 and 14 are operated to move the pushers 20 and 22 together.

Figure 4:
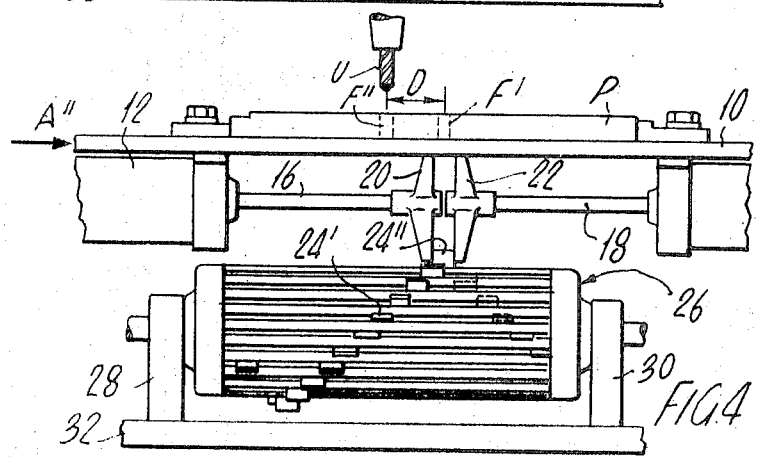

During this operation, pusher 22 first contacts projection 24'' causing a displacement of the associated piston and cylinder unit 14 to the right by a distance D. Cylinder unit 14 thus causes the movement of frame 10 to the right, positioning the workpiece P at the new position as shown in FIG. 4, where a second hole F'' can be drilled on the left-hand side of the previously drilled hole F'''. At the same time, the other pusher 20 moves forward against the leftside of projection 24' until tightly clamping the latter to hold table 10 and hence workpiece P firmly anchored at the new working position. Obviously, the same cycle of operative conditions can be carried out in an opposite direction to the former direction to provide a leftward displacement of workpiece P by an amount equal to or different from the preceding, dependent upon the particular projection 24 on drum 26 brought into position by the rotation of the drum under the control of processor 201.

A unit has been so far described for providing the movement for workpiece P along only one predetermined direction relative to tool U. Instead, when desiring to provide a movement according to two axes, particularly according two coordinate axes X and Y at right angles to each other, in accordance with the digital control scheme in FIG. 1, a second unit completely identical to that above described should be provided, so that one of the units would control the movements of the pieceholder table 10 along a coordinate axis, such as along axis X, while the other unit would move the assembly comprising said pieceholder table 10 and first unit in the other direction normal to the first direction or according to axis Y.

Thus, accurate positioning in any number of positions in a coordinate plane can be provided in accordance with the present invention. Further, it is evident from the foregoing, as to the movement or movements of workpiece P, that a relative displacement between the workpiece or workpieces and the associated tool or tools, in order to achieve the desired object the operation, could be carried out in a reverse direction to the former, that is maintaining the workpiece stationary and moving the tool or tools according to the coordinate axes, or alternatively moving the workpiece or workpieces along one axis, such as axis X, and moving the tool or tools along the other axis, such as axis Y.

Figure 8:
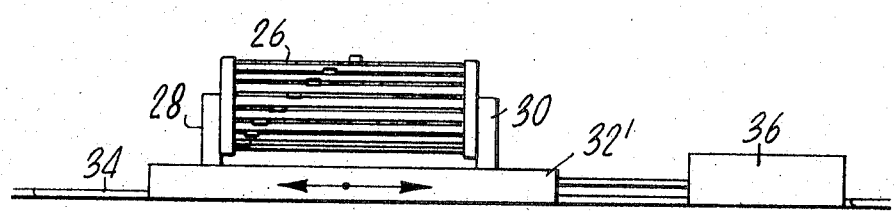
FIG. 8 shows a further modification of the embodiment of FIG. 2.

As shown in FIG. 8, to increase the operating range of each drum 26, the latter could be axially slidably carried through suitable guides, for example by a plane 32' sliding along guides 34 to move the assembly of drum 26 between two or more predetermined positions by an actuating means 36. Thus, the sizing of the positioning means can be held to a minimum and at the same time a wide operative area can be available.

In order to automatically carry out the cycle of the programmed movements, the described apparatus is associated with an electropneumatic or electrohydraulic system, such as schematically shown in FIG. 6, wherein the essential components are shown, using the same reference numerals for those parts shown in the preceding figures of the drawings. This system is connected to an electric power supply E for controlling the several electrovalves and to a power supply P1 for pressure fluid, such as pressure air.

As shown, compressed-air inlet conduit 100 is connected through a conduit 101 to a five-way electrovalve S3 controlling the piston and cylinder units 12, 14 and 12', 14' relating to drums or stop means (not shown) of two cartesian axes. Similarly, conduit 100 is connected through a conduit 103 to a distributor 104 with electrovalves S1 and S2 for controlling the general operating head, herein for controlling the double-acting piston 105 for feeding and retracting the tool (the latter not shown).

Similarly, conduit 100 is connected through conduits 106 and 107 to respective electropneumatic valves S4 and S5 for operating the piston and cylinder units 108 and 109, respectively, causing the axial displacement of the two drums or stop means (not shown) relative to the two cartesian axes.

In turn and from the power supply, the electric circuit comprises safety fuses 110 and a step-down transformer 111 feeding the entire circuit. First series interconnected limit contacts C1, C3, C5, C7 for the piston and cylinder units 12, 14, and 12', 14', are for supplying a gating signal to the electronic processing circuit 201, while corresponding series interconnected limit contacts C2, C4, C6, C8 supply a gating signal to the electrovalve S1 of device 103 through two of the closed limit contacts C11, C12, C13 or C14 associated with the piston and cylinder units 108 and 109.

The diagram in FIG. 6 illustrates the system in the cycle starting condition. According to the program, at the beginning of each cycle, one or both of the stepped motors are caused to rotate a predetermined amount so as to select one of the projections 24 on the associated drums or stop means, corresponding to the new working position to be obtained. Thereafter, the piston and cylinder units 12, 14 and/or 12', 14' are operated to close the associated sensors and to provide for the desired movement of the workpiece.

The operation of the piston and cylinder units causes the opening of contacts C1, C3 and C5, C7 and the closing of contacts C2, C4 and C6, C8, thus gating, for example through closed contacts C11 and C14, the electrovalve S1 for the slide valve 104 supplying cylinder 105 causing the operating head or tool associated therewith to move downwards. The downward movement of the operating head or the tool opens contact C9 and at the end of stroke closes contact C10 providing for energizing electrovalve S2, opening the slide valve 104 to atmosphere and at the same time causing a supply to cylinder 105 in a direction opposite to the first direction for raising the tool or operating head. Upon completion of the tool or operating head raising stroke, contact C9 closes again and supplies a gating signal to the electronic processing circuit 201, in turn driving the electrovalve S3 causing one or both of piston and cylinder units 12, 14 and 12', 14' to move back to the position shown in FIG. 6, so that a new operative cycle can be started.

At the beginning of a new operative cycle, the associated stop means or toothed drums can be maintained stationary at the previous position, or one or both of them can be axially moved to another operative area. This can be directly accomplished through the digital control by operating the associated relays 112 and 113 controlling the electrovalves S4 and S5 of the above mentioned piston and cylinder units 108 and 109. The operative cycle can now repeat quite identically as above described for as many times as the several programmed working positions.

The performances and advantages of the disclosed apparatus according to the present invention are apparent from the foregoing description. Thus, through a given programming and a proper amount of movable units, a high combination of positioning operations can be achieved.

As above stated, when desiring to provide complex positioning operations according to two or more directions, provision may be made for as many movable units as may be necessary, each of which been associated with an indexing means of the above described character.

For example, in FIG. 7 there is schematically shown a device for providing positioning operations according to two axes at right angles to each other and a third axis oblique and movable relative to the former to provide several polar coordinates. The device comprises positioning piston and cylinders units 12a, 14a (in addition to the several elements as above specified) to carry out the positioning steps in both directions A' and A'', and the piston and cylinder units 12b and 14b to carry out the positioning operations in both directions shown by arrows B' and B''. Both the stop devices or clamping means for the workpieces may, in turn, be rotated about an axis perpendicular to a plane as defined by directions A'-A'' and B'-B'', while a third device, comprising the piston and cylinder units 12r and 14r operating on one or both of the former devices, such as by a pinion-rack unit 140, 142, provides programmed rotary motion in directions R' and R'' about the axis. In this manner, a workpiece may be positioned in any desired direction to present it for any of various machining operations, such as hollow milling, welding operations, and the like.

From the foregoing disclosure and illustration, it will be apparent that further movement combinations and associations could be provided by apparatus according to the invention, by suitably combining a desired number of movable units, each associated with a positioning index assembly programmed by a digital-controlled apparatus, as in the above described embodiment.

Therefore, it should be understood that the foregoing disclosure and illustration with reference to the accompanying drawings was given by way of example only, any number of possible movement combinations and associations being within the scope of the present invention.

Figure 9:
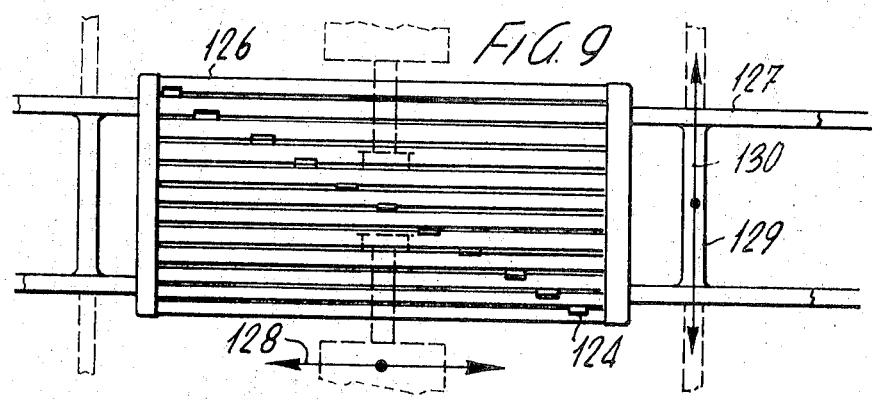
FIG 9 is a plan view showing a further embodiment of a positioning means according to the invention.

Moreover, as shown by way of example in FIG. 9, the rotating drums 26 could be replaced by slides or movable planes 126, each of which is provided with a projection 124 suitably spaced apart along a direction oblique to the plane. The planes 126 are movable on a first set of guides 127 in both directions of arrow 128, and in turn, the guides 127 are movable in a direction perpendicular to the first direction on corresponding guides 129 in both directions of arrow 130.

I claim:

1. A method for sequentially locating a workpiece carriage relative to a machine tool, comprising the steps of:
   indexing a drum having axially spaced, radial projections thereabout to one of a plurality of angular positions such that one of said projections is transported to a particular operative position relative to the machine tool;
   extending a pair of opposed, extendible push members mounted to the workpiece carriage toward each other and into contact with said one projection, both of said push members moving to a central position such that the coaction of said push members and said one projection causes said workpiece carriage to be shifted to a position corresponding to the axial position of said one projection;
   retracting said push members away from said one projection; and
   repeating the above steps, with the rotation of said drum for each sequence set forth about accomplished in accordance with a predetermined program.

2. The method as recited in claim 1 wherein said workpiece carriage is moved linearly by said push members.

3. The method as recited in claim 1 wherein said workpiece carriage is rotated by said push members.

4. The method as recited in claim 1 further including the step of digitally indexing the rotation of said drum to any of a plurality of discrete angular positions.

5. The method as recited in claim 1 further including the steps of storing a predetermined program of instructions corresponding to a desired sequence of machine tool operations to be performed on said workpiece and digitally indexing the rotation of said drum in accordance with said stored program.

6. Apparatus for sequentially locating a movable workpiece carriage relative to a machine tool frame comprising:
   a rotatable drum mounted on the frame and having a plurality of axially spaced, radial projections thereabout, means indexing rotation of said drum to any of a plurality of discrete angular positions such that any of said projections may be positioned at an indexing station, push means mounted to the carriage and including a pair of opposing pusher members disposed on either side of said drum and axially aligned therewith, said pusher members selectively extendible to a central location therebetween so as to engage that one of said plurality of projections disposed at said indexing station whereby said carriage is moved by the coaction of said pusher members and said one projection.

7. The invention as recited in claim 6 wherein said push means comprises a pair of piston and cylinder assemblies.

8. The invention as recited in claim 7 wherein said pusher members comprise said pistons and are movable to a minimum distance between each other, each of said projections being of the same size as said minimum distance thereby locking said carriage after movement.

9. The invention as recited in claim 6 wherein said indexing means comprises means to store a sequence of program instructions, and digital means responsive to said instructions for rotating said drum.

10. The invention as recited in claim 9 wherein said digital means includes a stepped motor connected to drive said drum.

11. The invention as recited in claim 6 wherein said projections are disposed along a helical path about said drum.

12. The invention as recited in claim 6 further including means mounted on the frame and supporting said drum for axial movement thereof between first and second spaced positions and locking the same therein.

13. The invention as recited in claim 6 wherein said carriage includes a workpiece holder rotatable by the action of said push means against said projections.

* * * * *